Figure 1:
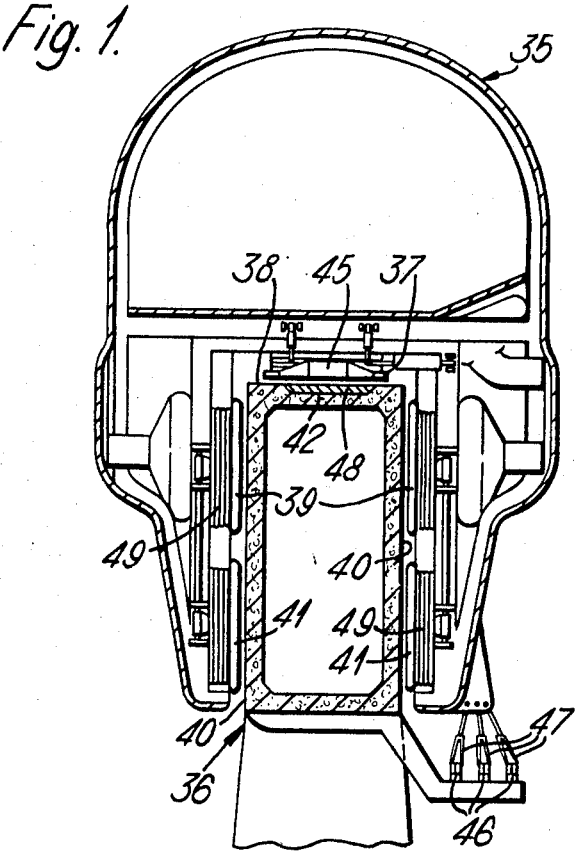

United States Patent
Haynes

[15] 3,667,397
[45] June 6, 1972

[54] LINEAR INDUCTION MOTOR SECONDARY MEMBER

[72] Inventor: Richard Humphrey Haynes, Hemingford Grey, England

[73] Assignee: Tracked Hovercraft Limited, London, England

[22] Filed: June 25, 1971

[21] Appl. No.: 156,624

[52] U.S. Cl. ........................................104/148 LM, 310/13
[51] Int. Cl. .............................................................H02k 41/04
[58] Field of Search.............................................310/12–14; 104/148 LM, 148

[56] References Cited

UNITED STATES PATENTS

| | | | |
|---|---|---|---|
| 3,612,395 | 10/1971 | English | 310/12 X |
| 3,577,928 | 5/1971 | Victorri | 104/148 LM |
| 3,516,364 | 6/1970 | Machefert-Tassin | 310/13 X |
| 3,585,939 | 6/1971 | Laithwaite | 310/13 |

*Primary Examiner*—D. F. Duggan
*Attorney*—Cameron, Kerkam and Sutton

[57] ABSTRACT

The secondary member in or for a linear induction motor of the single-sided and short stator variety is mounted generally horizontally for co-operation with a linear induction motor primary member carried above it. The secondary member comprises a rolled aluminum reaction plate with downwardly-inclined side edges, and magnetic material which is interposed between the track and the plane central part of the reaction plate. The reaction plate extends beyond the magnetic material along either side, and supports are provided for supporting the overhanging portions from the track inwardly of the downwardly-inclined parts. The reaction plate is secured in position by members which are attached to the track along either side of the secondary member and which abut the upper surfaces of the downwardly-inclined parts of the reaction plate.

14 Claims, 6 Drawing Figures

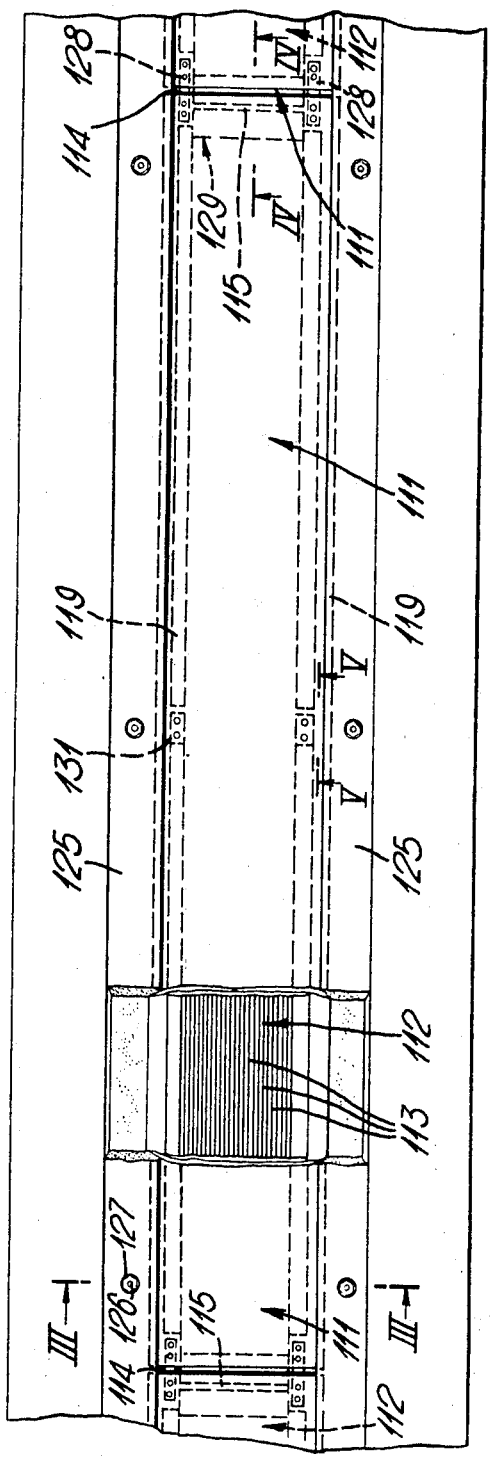

LINEAR INDUCTION MOTOR SECONDARY MEMBER

This invention concerns the secondary or "rotor" member for a single-sided linear induction motor, that is to say, a linear induction motor in which the primary or "stator" member which carries the energizing windings is arranged on one side only of the secondary member. The secondary member comprises a reaction plate of electrically conductive and preferably non-magnetic material which is backed by magnetic backing material. The primary member is arranged to produce a longitudinally travelling magnetic field, and in operation flux due to this field passes through the reaction plate to the magnetic material and from the magnetic material returns to the primary member. The interaction of the flux with currents which it induces in the reaction plate creates propulsive force which is directed longitudinally of the motor.

In particular, the invention relates to secondary members for single-sided linear induction motors in which the reaction plate has side portions for providing low resistance current paths along each side of the secondary member beyond the magnetic material. The side portions overhang the side edges of the magnetic material, and, because for low self-inductance the low resistance paths should be clear of the magnetic material, they are formed generally in the same plane as the part of the reaction plate overlying the magnetic material.

One of the most important applications of single-sided linear induction motors is to vehicle propulsion in transportation systems in which vehicles are arranged to operate along a prepared track. In such an application each vehicle may be provided with a primary member as described above, for co-operation with a secondary member which extends along the track. The reverse "short rotor," arrangement is possible, i.e. the vehicles may each carry a secondary member for co-operation with a wound primary member extending along the track, but it is with the former type of system, hereinafter to be referred to as a "short stator" system, that the present invention is concerned.

One of the major items of cost in a transportation system using linear inducation motor propulsion lies in the part of the motor carried by the track—this is a primary reason why a "short rotor" system is not usually adopted—and it is therefore highly desirable in a "short stator" system that the secondary member should be cheap and easy to install and maintain. It is an object of the present invention to provide such a secondary member for a linear induction motor in a "short stator" system.

According to the invention there is provided, in combination, a prepared track and a generally horizontal linear induction motor secondary member extending along the track for co-operation with a single-sided linear induction motor primary member carried above it by a vehicle arranged for operation along the track whereby to propel the vehicle, arranged for operation along the track whereby to propel the vehicle, the linear induction motor secondary member comprising an electrically conductive reaction plate, magnetic material beneath the reaction plate and interposed between the reaction plate and the track, the reaction plate being wider than the magnetic material so as along the sides of the secondary member to extend beyond the magnetic material in side portions for providing longitudinal paths for secondary member current, and clamping means for separate co-operation with the said side portions and attached to the track to secure the reaction plate in position by abutting engagement with the upper surface of the side portions.

Figure 3:
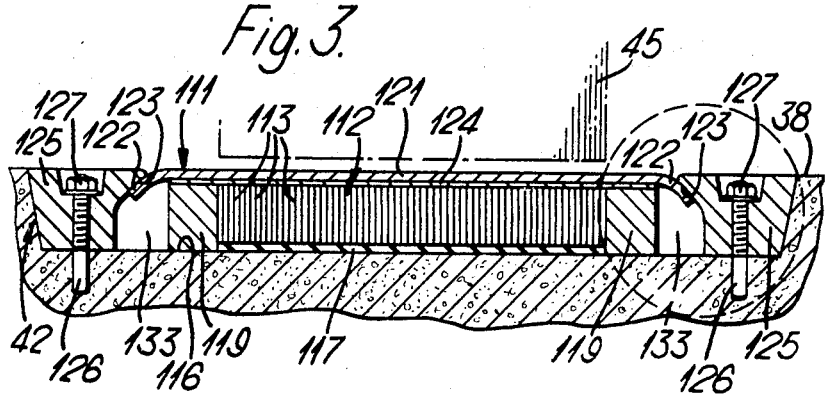
Figure 4:
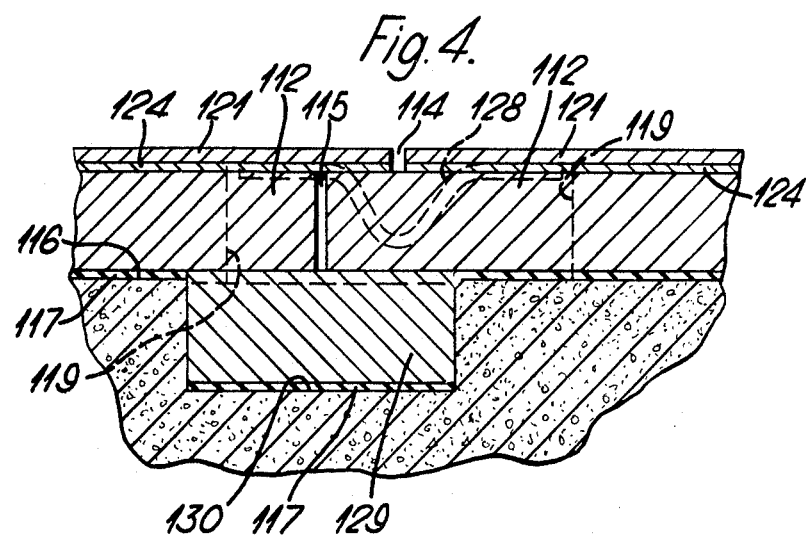
Figure 5:
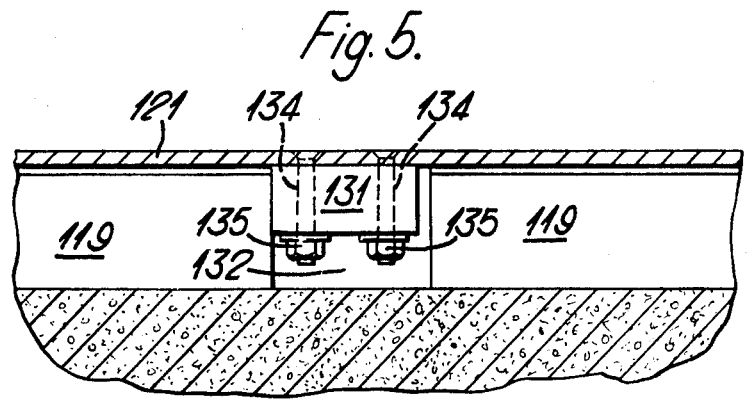
Figure 6:
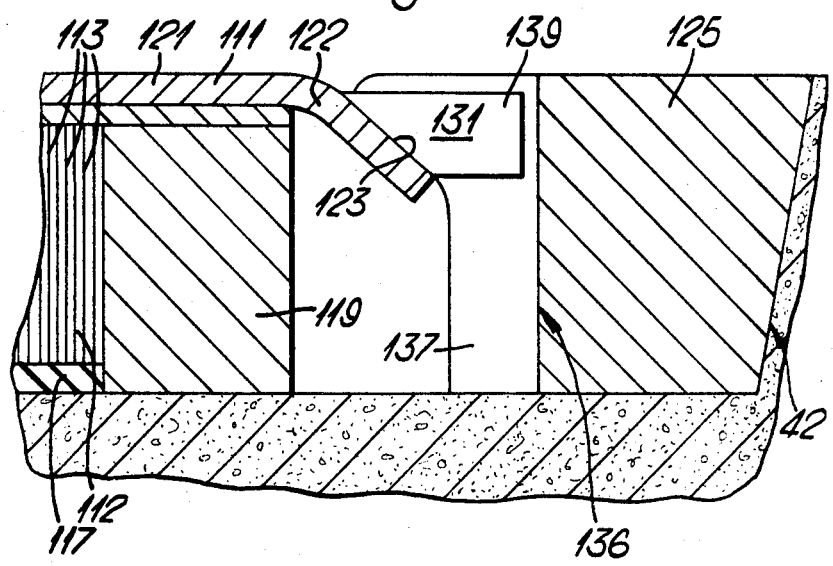

In order that the invention may be more fully understood, an embodiment of the invention and a modification thereof will now be described, by way of example, with reference to the accompanying diagrammatic drawings, in which:

FIG. 1 shows a gas cushion vehicle arranged for operation along a prepared track and propelled by a linear induction motor of which the secondary member embodying the invention extends along the track, FIG. 2 shows a typical length of the track, as seen from above, FIG. 3 is part of a sectional view taken on the line III—III of FIG. 2, showing the secondary member and its attachment to the track, FIG. 4 shows a detail of the secondary member, being part of a sectional view taken on the line IV—IV of FIG. 2, FIG. 5 shows a further detail of the secondary member, being part of a further sectional view taken on the line V—V of FIG. 2, and FIG. 6 shows the general area circled in FIG. 3 of the secondary member when modified.

Referring now to FIG. 1 of the drawings, an air cushion vehicle 35 is supported for operation along an elevated concrete track 36 of generally rectangular cross-section by two longitudinally spaced air cushion support pads 37 (one of which is visible) co-operating with the horizontal top track surface 38 through the medium of cushions of air. Likewise the vehicle is guided along the track by two longitudinally spaced pairs of opposed air cushion guidance pads 39 co-operating with the vertical side track surfaces 40. Further air cushion pads 41 mounted beneath the guidance pads 39 of the rear pair also co-operate with the side surfaces 40 to provide stability against vehicle rolling motions due, for example, to side winds. The pads 37, 39 and 41 are each resiliently carried from the vehicle body by flexible bellows 49.

A linear induction motor is provided for propelling the vehicle along the track. The primary member 45 of this motor is carried centrally beneath the vehicle body and is conventionally formed with magnetic material and energizing windings (not separately shown) arranged to produced a longitudinally travelling field of magnetomotive force when energized with three-phase alternating current. This a.c. power is supplied from a trackside supply via static conductor rails 46 extending along the track and co-operating pick-up shoes 47 on the vehicle.

The secondary member of the induction motor, indicated in FIG. 1 by the reference numeral 48 only so far as its location is concerned, extends along the track 36 within a channel 42 centrally formed in the top of the track. FIGS. 2 to 5 show in detail the arrangement of the secondary member; from them, in particular from FIG. 2, it will be seen that the secondary member comprises a composite reaction plate formed of a plurality of individual aluminum reaction plates 111 arranged end-to-end along the track above magnetic material formed of stacks 112 of longitudinally extending, vertical magnetic laminations 113. The stacks 112 are also arranged end-to-end, being of the same length as the plates 111 and having the discontinuities 115 between them slightly offset from the discontinuities 114 between the plates 111.

As can be clearly seen in FIG. 3 which shows a typical part of the secondary member in cross-section, each lamination stack is of rectangular cross-section and is disposed centrally within the channel 42, being bonded to the generally flat bottom 116 of the channel by a layer 117 of a material which is able to deform in shear to accommodate differential thermal expansion and contraction between the lamination stack and the underlying concrete of the track 36 in both the longitudinal and transverse directions.

Along each side of the stacks 112 are two generally continuous concrete projections 119 of rectangular cross-section which may be integral with the track proper or may be added later and grouted into position. The projections are of the same height as the stacks 112.

Each reaction plate 111 is formed from rolled aluminum plate which is bent along its side edges so as to have a flat central portion 121 flanked by two inclined edge portions 122. The flat central portion extends across the underlying stacks 112 and projections 119 to support the reaction plate. The edge portions overhang the projections 119 along either side and extend downwardly to their free edges so as to present downwardly inclined upper surfaces 123 which are recessed towards the track.

The central portions 121 of the reaction plates 111 are separated from the stacks 112 and projections 119 by respective sheets 124 of a wear and heat resistant and electrically insulating material such as resin bonded asbestos paper. These sheets protect the lamination stacks from high temperatures which may occur in the reaction plates during operation; they also prevent sparking between the reaction plates and the lamination stacks and prevent them from fretting when their opposed surfaces move across one another due to differential thermal expansion and contraction.

Blocks 125 of concrete or other material attached to the track proper engage the surfaces 123 so as to secure the reaction plates 111 in position. The blocks 125, which are added after the reaction plates have been placed in position during assembly, may be permanently secured to the track proper (as by grouting) or they may be removably secured to the track proper as by studs 126 and co-operating nuts 127.

The top surfaces of the central portions 121 of the reaction plates and the top surfaces of the blocks 125 are flush with one another and with the surface of the concrete on either side of the channel 42, so as to constitute part of the top track surface 38 from which the vehicle is supported by the air cushions formed by the air cushion support pads 37.

The discontinuities 114 and 115 between, respectively, the reaction plates and the lamination stacks constitute expansion gaps accommodating differential expansion and contraction of those items relative to the track in its longitudinal direction. As can be seen in FIGS. 2 and 4, each gap 114 between successive reaction plates is bridged electrically by a pair of flexible braid connections 128 which connect the adjacent ends of the reaction plates together at the flat central portions 121, one on each side of the stacks 112. The connections 128, which are welded or otherwise secured at their ends to the reaction plates, are located underneath the reaction plates and breaks are formed in the projections 119 to accommodate them. For the same purpose notches are also formed in the corners of the sheets 124.

FIG. 4 also shows one of the expansion gaps 115 between lamination stacks 112. The gap 115 is magnetically bridged by a short stack 129 formed of further ones of the magnetic laminations 113. The stack 129 is received on a further layer 117 in a well 130 specially provided in the bottom 116 of the channel, and underlies the ends of the adjacent stacks 112 separated by the gap 115.

The ends of the stacks 112 are slidable across the top face of the stack 129 underneath them, and in this way differential thermal expansion and contraction in the longitudinal direction is accommodated while at all times maintaining magnetic continuity between the stacks 112.

For weather protection and/or (as appropriate) in order to prevent loss of support cushion pressure as the air cushion vehicle passes over them, the expansion gaps 114 and 115 and the cavities 133 (FIG. 3) formed beneath the edge portions 122 of the reaction plate are filled with sponge rubber, foamed plastic or other resilient and weather resistant material not shown in the drawings.

As shown in detail in FIG. 5, a pair of aluminum blocks 131 are welded or otherwise attached (as by bolts 134 and co-operating nuts 135) to the underside of each reaction plate 111 midway along its length so as to extend downwardly into further breaks 132 in the projections 119 and corresponding notches in the sheet 124.

In operation, with the primary member 45 supported at a small distance (e.g. 1 centimeter) above the secondary member as indicated in FIG. 3 by the ghosted lines, the field of magnetomotive force created in known manner by the primary member energizing windings drives flux around the longitudinally directed, vertical, low reluctance paths which are provided in combination by the magnetic material of the primary member and the stacks 112, 129 of the secondary member. This longitudinal flux in turn induces currents to flow in the reaction plates 111 in generally rectangular and horizontal flow paths corresponding to the magnetic poles of the travelling field, and the electromagnetic interaction of these currents with the originating flux produces propulsive force for driving the vehicle 35 along the track 36. Such production of propulsive force is known and therefore not described in detail.

The thrust exerted on the reaction plates in producing the propulsive force is reacted by the engagement of the back faces of the blocks 131 with the front end faces of the projections 119 at the breaks 132, as is shown in FIG. 5.

In addition to reacting the propulsive force in this way, the projections 119 serve various additional functions amongst which is providing location for the centers of the reaction plates longitudinally of the track in order to ensure that thermal changes in relative length between the reaction plates and the track will be shared approximately equally between the gaps 114.

A further function of the projections 119 is to provide support for those portions of the reaction plate which project laterally beyond the lamination stacks 112, the "side portions," against mechanical and electromechanical forces which are imposed upon them in operation. The projections 119 therefore reduce the bending of the reaction plates due to such forces, both beyond and above the lamination stacks 112.

The side portions mentioned in the preceding paragraph provide low resistance paths which are free of any substantial flux crossing the air gap between the primary and secondary members and in which can flow the longitudinally directed parts of the induced secondary member currents. The current flow in the reaction plate 111 where it lies within the primary-secondary magnetic circuit can therefore be substantially transverse of the motor and therefore substantially fully effective to create propulsive force. The flexible connections 128 provide continuity for the longitudinally directed parts of the secondary member current paths while accommodating relative longitudinal movement of the ends of the reaction plates 111 to which they are connected.

During operation it may happen that the secondary member is subject to a net upward force by reason of the magnetic attraction to the primary member of the lamination stacks 112 and 129. Under such circumstances the net upward force is counteracted mostly by the layers 117 and, to a lesser extent, by the blocks 125.

It may be possible to counteract the attractive force on the secondary member wholly by means of the blocks 125, in which case the layers 117 are omitted or are of non-adhesive material; it is believed, however, that this is unlikely to be satisfactory because of the hogging (i.e. lifting above the lamination stacks 112) which the reaction plates are likely to undergo when the lamination stacks are subject to the attractive forces.

The main purpose of the blocks 125 is to secure the reaction plates 111 in position against theft and to provide surfaces along either side of the secondary member which together with the secondary member can, in an emergency, be engaged by skids mounted on the primary member.

Although, as described above, the blocks may be arranged to counteract part, if not all, of the attractive forces which may be imposed upon the secondary member, it may be found necessary or desirable that they should counteract little or none of the attractive forces, the attractive forces then being counteracted solely by the layers 117.

In a modification of the described embodiment, shown in FIG. 6, the blocks 131 are mounted on the upper sides of the edge portions 122 of the reaction plates rather than underneath the central portions 121.

Each block 131 is of the cross-section shown and as before is located midway along its respective reaction plate, being secured against the respective edge portion with its end faces 139 (one of which can be seen in the drawing) vertical.

Corresponding longitudinally to the blocks 131 the blocks 125 (which are grouted instead of bolted to the track) are formed with notches 136 having vertical side faces 137 spaced by a distance which is just greater than the length of the blocks 131. The side faces 137 provide reaction surfaces for locating the reaction plates in the longitudinal direction and so serve the same function as the end faces of the projections 119 in the arrangement previously described.

To assemble the secondary member the reaction plates 111 are placed in position with the blocks 131 in the notches 136. The parts of the notches above and behind the blocks 131 are then filled with a bitumastic compound for weather protection.

Since in this modification the projections 119 are required to react only vertical forces and are not, for example, required to react propulsive thrust, they may be formed of loose bricks laid end-to-end. In the arrangement described with reference to FIGS. 1 to 5 the projections 119 may likewise be formed of loose bricks except in the neighborhood of the breaks 132 where they are fixed in position longitudinally of the track.

If desired, in either of the described arrangements layers of low-friction or resilient material may be interposed between the surfaces 123 of the reaction plates 111 and the co-operating surfaces of the blocks 125. The purpose of these layers is to reduce wear at the interfaces due to differential thermal expansion and contraction and/or to accommodate some of the movement so as to reduce the forces on the reaction plates.

It will be appreciated that in the described embodiment and the modification thereof there is no need for the expansion gaps 114 and 115 to be in the particular relative position shown; any relative position may be used. Likewise the lengths of the reaction plates and of the lamination stacks may be chosen independently of one another.

In the described arrangements the expansion gaps 115 between lamination stacks are bridged magnetically by the members 129. It may be possible, however, to omit some or all of the members 129 if the expansion gaps are sufficiently small or if the resulting disturbances of the primary member can be tolerated on the vehicle. A particular need for the members 129 exists where the secondary member is required to span an expansion gap between long lengths of track, in which case a total movement of several inches may need to be accommodated.

In a modification of the described arrangements each stack 112 is positively located with respect to the track midway along its length by bolting or the like.

Where recessing of the side portions of the reaction plate is provided for engagement by the clamping means, the recessing may be by one or more steps rather than by an inclined plane (or curved) surface.

The invention has been described in relation to single-sided linear induction motors in which the flux passes in the motor in a longitudinal direction. The invention is not, however, limited to secondary members for this type of motor, but also includes within its scope secondary members for single-sided linear induction motors in which the motor flux is at least partly directed transversely of the motor. The magnetic backing material may then be formed of transversely orientated vertical laminations.

Although the invention has been described in relation to laminated magnetic backing material, the magnetic material may be solid or it may be a combination of solid and laminated material.

The invention is in no way limited to air cushion vehicle systems but may be applied to any transportation system in which vehicles are driven along a prepared track by a single-sided linear induction motor of which the secondary member extends along the track, the induction motor therefore being of the "short stator" variety.

I claim:

1. In combination a prepared track and a generally horizontal linear induction motor secondary member extending along the track for co-operation with a single-sided linear induction motor primary member carried above it by a vehicle arranged for operation along the track whereby to propel the vehicle, the linear induction motor secondary member comprising an electrically conductive reaction plate, magnetic material beneath the reaction plate and interposed between the reaction plate and the track, the reaction plate being wider than the magnetic material so as along the sides of the secondary member to extend beyond the magnetic material in side portions for providing longitudinal paths for secondary member current, and clamping means for separate co-operation with the said side portions and attached to the track to secure the reaction plate in position by abutting engagement with the upper surfaces of the side portions.

2. A combination according to claim 1, wherein the secondary member is received in a channel formed in the track and the clamping means co-operate with the side portions at recessed parts including the side edges of the reaction plate, the track at either side of the channel, the clamping means, and the reaction plate other than the recessed parts thereof in combination presenting an upwardly facing and generally plane surface.

3. A combination according to claim 1, wherein the clamping means co-operate with the side portions at parts of the reaction plate which include the reaction plate side edges and which are inclined downwardly towards the side edges.

4. A combination according to claim 1, which includes supports on either side of the magnetic material for supporting the side portions from the track against downward forces which may be imposed upon them.

5. A combination according to claim 4, wherein the side portions comprise recessed parts which project laterally beyond the supports to the side edges of the reaction plates, the clamping means engaging the side portions at the upper surfaces of the recessed parts.

6. A combination according to claim 5, wherein the recessed parts are inclined downwardly towards the side edges of the reaction plates.

7. A combination according to claim 1, which includes an adhesive layer bonding the undersurface of the magnetic material to the track, the adhesive layer in operation counteracting at least part of any net upward force on the secondary member caused by attraction to the primary member of the magnetic material of the secondary member, and deforming in shear to accommodate differential thermal expansion and contraction between the magnetic material and the track.

8. A combination according to claim 1, wherein the reaction plate has a projection extending downwardly from each side portion for co-operation with at least one member secured to the track whereby to locate the reaction plate longitudinally in position.

9. A combination according to claim 8, wherein each said member also provides support for the respective side portion against downward forces which may be imposed upon it.

10. A combination according to claim 6, wherein the reaction plate has a projection extending outwardly from the upper surface of each recessed part for co-operation with at least one member secured to the track whereby to locate the reaction plate longitudinally in position.

11. A combination according to claim 10, wherein the said member forms part of the clamping means.

12. A combination according to claim 4, which includes a sheet of resin impregnated asbestos separating the reaction plate from the magnetic material and the supports.

13. A combination according to claim 1, wherein the magnetic material is formed of a plurality of blocks of magnetic material extending along the track with gaps between the adjacent ends of successive blocks for accommodating differential thermal expansion and contraction relative to the track, the combination including, for each said gap, a magnetic member disposed in overlapping relationship beneath the magnetic blocks forming the gap so as magnetically to bridge the gap, at least one of the magnetic blocks being arranged for longitudinal movement with respect to the magnetic member where they overlap one another.

14. A combination as claimed in claim 1, wherein the clamping means are releasably attached to the track.

* * * * *